US008621599B2

(12) United States Patent
King et al.

(10) Patent No.: US 8,621,599 B2
(45) Date of Patent: Dec. 31, 2013

(54) SECURITY IN NETWORKS

(75) Inventors: Neal J. King, Munich (DE); Charles Bry, Unterhaching (DE)

(73) Assignee: Infineon Technologies AG, Neubiberg (DE)

(*) Notice: Subject to any disclaimer, the term of this patent is extended or adjusted under 35 U.S.C. 154(b) by 451 days.

(21) Appl. No.: 12/503,731

(22) Filed: Jul. 15, 2009

(65) Prior Publication Data

US 2010/0017871 A1 Jan. 21, 2010

Related U.S. Application Data

(60) Provisional application No. 61/081,049, filed on Jul. 16, 2008.

(51) Int. Cl.
*G06F 9/00* (2006.01)
(52) U.S. Cl.
USPC ............................................. 726/14; 726/27
(58) Field of Classification Search
USPC ........................................ 726/3, 14, 26–30
See application file for complete search history.

(56) References Cited

U.S. PATENT DOCUMENTS

| | | | |
|---|---|---|---|
| 5,819,091 A | 10/1998 | Arendt | |
| 8,024,788 B2 | 9/2011 | Arnold | |
| 2003/0061404 A1* | 3/2003 | Atwal et al. | 709/328 |
| 2003/0093548 A1* | 5/2003 | Cinghita et al. | 709/231 |
| 2005/0257052 A1 | 11/2005 | Asai | |
| 2006/0026681 A1* | 2/2006 | Zakas | 726/22 |
| 2007/0140494 A1 | 6/2007 | Kumoluyi | |
| 2007/0282858 A1* | 12/2007 | Arner et al. | 707/10 |
| 2008/0072034 A1 | 3/2008 | Lescuyer | |
| 2008/0134347 A1* | 6/2008 | Goyal et al. | 726/29 |

FOREIGN PATENT DOCUMENTS

GB 5411557 A 8/2005

OTHER PUBLICATIONS

IEEE Standard for Information technology—Telecommunications and information exchange between systems—Local and metropolitan area networks—Specific requirements Part 11: Wireless LAN Medium Access Control (MAC) and Physical Layer (PHY) Specifications, Chapter 8 "Security", pp. 155-250, IEEE Std 802.11™ -2007.
IEEE Standard for Local and metropolitan area networks, Port-Based Network Access Control, Chapter 6 Principles of Port Access Control operation, pp. 11-22, IEEE Std 802.1X™ -2004.
IEEE Standard for Local and metropolitan area networks, Port-Based Network Access Control, Chapter 8 Port Access Control Protocol, pp. 33-71, IEEE Std 802.1X™ -2004.

* cited by examiner

*Primary Examiner* — Hadi Armouche
(74) *Attorney, Agent, or Firm* — SpryIP, LLC

(57) ABSTRACT

A communication system may be configured to control by a security controller the use of a node in a network for a service or application to transmit data via the node, wherein the security controller controls the use of the node based on a predetermined list indicating whether the service or application is allowed for the node, the predetermined list including combined identifiers for client applications and identifiers for network nodes.

12 Claims, 4 Drawing Sheets

| 1 | 2 |

FIG. 4a

| 1 | 2 | 1 | 2 | 2 | 2 |

FIG. 4b

SECURITY IN NETWORKS

REFERENCE TO RELATED APPLICATIONS

This application claims the benefit of the priority date of U.S. provisional application 61/081,049 filed on Jul. 16, 2008, the contents of which are herein incorporated by reference. This application cross-relates to copending application having Ser. No. 12/503,728 claiming the benefit of the priority date of the above U.S. provisional application 61/081,049.

BACKGROUND

A home network is intended for distribution of broadband services within a customer's premises and communication between various units of customer equipment. In current practice, both wire-line and wireless home network solutions are used. With a wire-line solution, an home network contains multiple nodes, all connected to a wire-line medium. Different nodes may be connected to different wire-line media, and some nodes may be connected to more than one medium including those which bridge between home network domains established on different media types. But as long as legitimate communication between two nodes is possible, they are considered to belong to the same home network. With wireless services, stations usually communicate with an Access Point, which is a central node of the network, generally connected to the other central nodes by fixed (usually wire-line) connections (links). The Access Point forwards (relays) messages between the wireless stations and the rest of the network. A home network may also be comprised of a combination of wireline and wireless networks: as long as stations and nodes can communicate with each other, they are considered to belong to the same home network.

One of the main issues for home network solutions, either wire-line or wireless, is security. Home networks operate over shared media which means that home network devices belonging to different people and intended to be operating in mutually disjoint and separate logical networks could be connected to the same wire (as in the case of home network over power lines or over cable), or simply have easy physical access to each other (e.g., wireless devices in close proximity, or by crosstalk between phone lines and power lines). Any unprotected communication over the media can be picked up by any equipment using the network.

The home network nodes may communicate both with a residential gateway (RG), to obtain broadband services such as TV, VoIP, and gaming from external sources, and internally with other home network nodes to share on-premise sources of digital content located in the customer's premises, such as a Digital Video Recorder (DVR) or a computer's streaming-video applications, entertainment centers, and so on.

For all these communications, confidentiality of the data stream is critical to the application. Even if all the people using a home network are in the same family, there will be information that should not be shared with parties not directly involved in the communication and if there are different groups of people sharing the use of an home network in one location (e.g., when the home network is used in a hotel or small-office setting), or if there are visitors using the home network, this is even more important. In addition, networks based upon a shared medium are often susceptible to having messages intended for some of the nodes of the network being physically detected and received by equipment that is not a legitimate member of the network.

For all these reasons, confidentiality of communications among nodes of the home network is a key criterion for the usefulness of the network.

It is equally important that communications received over the home network be trustworthy. The contents of messages should not be altered or if alteration occurs, it must not go undetected. The transmission system of the medium may use forward error correction (FEC) techniques to prevent misinterpretation due to transmission errors, but such techniques are not designed to protect against deliberate alteration to the content of the message, which would be done at a higher layer of processing.

Conventionally, the two issues of security, confidentiality and trustworthiness, between communicating nodes are addressed in the following way. Use of a cryptographic key known only to the transmitter node and to the receiver node. The transmitter processes the contents of every message to produce a cipher text. This cryptographic output cannot be understood by anyone who not possess the key but can be taken as the input to a decryption process by a possessor of that key to undo the encryption and produce the plaintext. Use a different cryptographic process on the original message to assure integrity of the communicated message. This process produces a short cryptographic output, called a Message Authentication Code. The Message Authentication Code is sent to the receiver along with the cipher text. If the received Message Authentication Code is the same as the Message Authentication Code calculated by the receiver on the basis of the received message, on the basis of an authentication key (which may or may not be the same as the confidentiality key) a strong assurance is provided that the received message has not been altered during the transmission because the cryptographic function chosen to calculate the Message Authentication Code is such that it is overwhelmingly unlikely that the message text could be altered without changing the result of the Message Authentication Code calculation.

Thus, the issue of providing confidentiality and message integrity boils down to the question of providing a set of keys to each pair of communicating nodes. In order to maintain security within each pair, no two pairs should share the same set of keys—not even in the case that the two pairs have a member in common.

The strength of encryption used to protect a communication depends on the length of the encryption key that is used. Thus, when two communication channels are protected by the same encryption technique, but one uses a longer key than the other, it will be better protected. Generally speaking, a good measure of the difficulty of "breaking" the security of a communications channel is the number of computations required to uncover the key. It is generally assumed when evaluating this difficulty that the attacker knows which technique and algorithm is being used, since there are many ways of finding this out for commercially provided equipment. This number of computations depends exponentially on the length of the key.

Within a home network, it may be the case that some communications may be of greater confidentiality than others. For example, it may not be as important to protect video-stream showing entertainment videos as much as to protect the transmission of confidential personal information or security-related information, such as passwords, or the data-stream of a confidential telephone call. Current methods of protection provided for home networks give the same degree of protection to all these communications.

In particular, current methods of providing home network security do not distinguish between different services or Client Applications that use the same node. The node offers the transport and the security as a complete package to all, and the security system cannot discriminate among them.

BRIEF DESCRIPTION OF THE SEVERAL VIEWS OF THE DRAWINGS

FIGS. 4a and 4b show embodiments of using a fraction of a key for providing a key.

DETAILED DESCRIPTION

Figure 1:
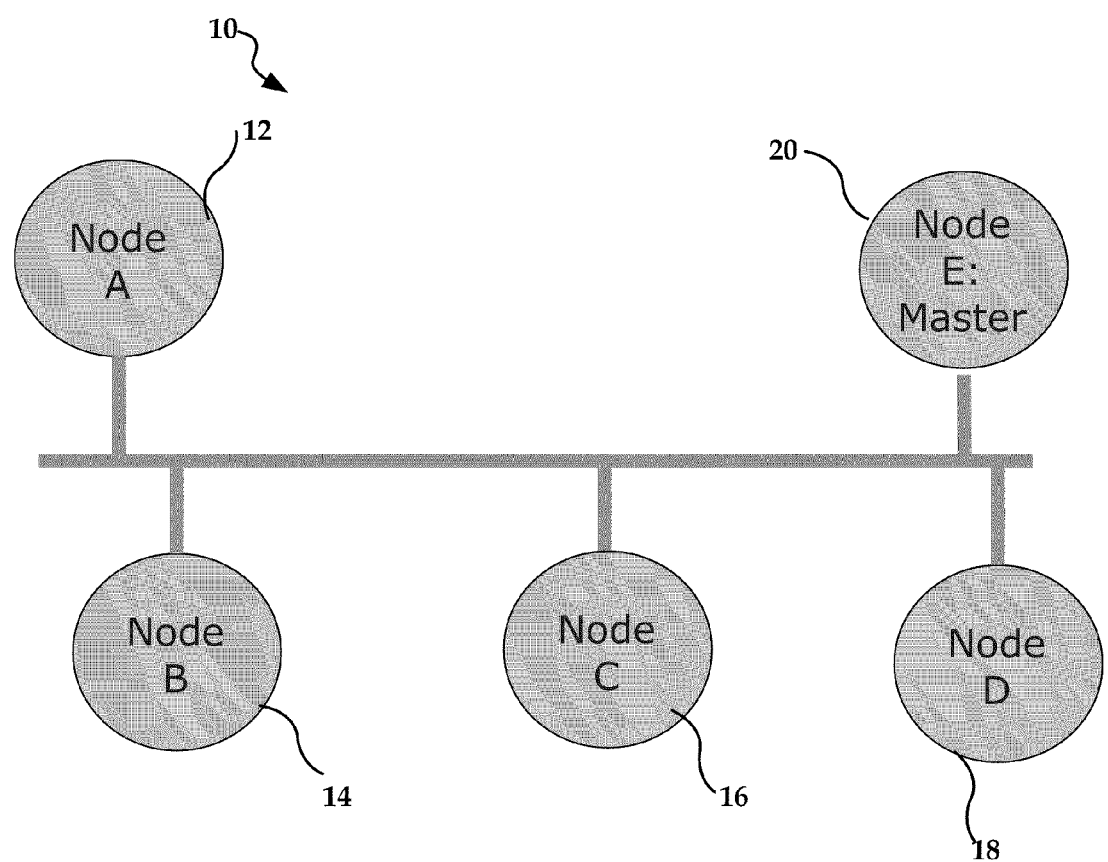
FIG. 1 shows a diagram of a network according to an embodiment.

The following detailed description explains exemplary embodiments of the present invention. The description is not to be taken in a limiting sense, but is made only for the purpose of illustrating the general principles of embodiments of the invention while the scope of protection is only determined by the appended claims.

In the exemplary embodiments shown in the drawings and described below, any direct connection or coupling between functional blocks, devices, components or other physical or functional units shown in the drawings or described herein can also be implemented by an indirect connection or coupling. Functional blocks may be implemented in hardware, firmware, software, or a combination thereof.

Further, it is to be understood that the features of the various exemplary embodiments described herein may be combined with each other, unless specifically noted otherwise.

In the various figures, identical or similar entities, modules, devices etc. may have assigned the same reference number.

In the following embodiments of a new concept for security of a network such as a shared network is described. The new security concept may be implemented in a home network.

In some embodiments it is assumed that a method for authenticating nodes and providing encryption keys to pair of nodes is already in use, as there are already methods for this. In these embodiments a modification of any such method can be provided to obtain multiple degrees of security for different services provided over a home network, and to maintain a specific degree of security even when the connecting wireline node or access point node is changed during the course of the protected communication.

In embodiments, a first security level is provided for a first link of a shared home network. The link switches to a second security level providing a higher degree of security for the first link. In embodiments, the switching to a higher degree is initiated when an entity is engaged with the first node to transmit data on the first link and the entity had previously transmitted data on another link of the network with the second security level. The network may of course provide switching between more than two security levels. Whenever the entity disengages with the first link and moves to another node to start transmitting on a new link, the new link will provide at least the second security level or a higher security level for the transmission of the data on the new link. The switching is provided automatically without notifying the entity. In other words, the switching is part of a security service provided to the entities using the shared medium. For the first link, when the entity which caused the switching to the higher second security level leaves the node to transmit on another link or transmits via the same node on another link, a decision can be made whether the higher security level is maintained or whether the security level is switched back to the first security level.

The switching to a higher degree may also be initiated when a new client application or service starts to transmit on the link. Thus, even though the data are provided by a same equipment such as a laptop having WLAN access, the change of a client application, for example from a video application to an email application, may initiate the switching of the first link.

In some embodiments, multiple levels of security are provided for communications between nodes in a network. A level of security is selected from the multiple levels of security for transmitting first data send by a client application via a first node to a second node, wherein the selecting of the level of security is depending on the client application sending the first data. As will be described below, a list of allowed combinations of client applications or services and nodes may be provided. Based on this list, a client application or a service of the client may be rejected to use a specific node for transmitting data over a link.

A security controller controls the use of a node in a network for the service or application which want to transmit data via the node based on the predetermined list indicating whether the service or application is allowed for the node. The predetermined list may include also more than one services or more than one applications from a same entity of the network.

The service or application may be implemented at a first communication protocol layer and the node may be implemented at a second protocol layer, the first communication protocol layer being higher than the second communication protocol layer.

Information indicating allowable combinations of nodes and client applications may be provided and used in the security controller of the network to control the provision of services by the nodes of the network. The services provided by the node may for example be a transmission of data via the node over a link to a further node.

Embodiments of the invention provide a higher degree of encryption protection for more sensitive and confidential transmissions, which can be applied as an enhancement to any technique for Authentication & Key Management (AKM). In embodiments, the above features can be provided with minimal additional overhead. Finally, these new methods of providing security can be provided in such a way that a transmitting Client Application, User Equipment or Wireless Station that is employing this extra degree of protection can continue to rely upon it, even if it should change the wireline or wireless node, such as a wireless access point, by which it is connecting to the home network, during the course of the transmission. The transmission will suffer no interruption extra to what it must experience in any case, to effect the change of node or access point.

Some embodiments address a concept which is directed to the authorization for the use of a node by a particular Client Application, User Equipment or Wireless Station, based upon inclusion on a list of approved combinations.

Some embodiments address a concept which is based on the provision of increasing degrees of encryption protection, distinguished by using increasing fractions of a previously agreed encryption key.

All of these embodiments can be seen independently, however they can also be combined with each other to provide a security mechanism for the network.

For a single node, connection to another node may be offered to more than one Wireless Station or User Equipment at a time or to more than one Client Application on a single item of equipment at a time. Any such entity logically resides on a higher protocol-level than does the node. Thus, in order for the node to discriminate among these different client entities which are thereafter denoted as "Client/Equipment", the control plane of the security protocol must become aware of these entities.

Referring now to FIG. 1, a home network 10 is shown to contain a plurality of nodes 12, 14, 16, 18 and 20. One of the nodes may be a master node and may provide for certain central administrative functions, such as controlling general access to the medium. In FIG. 1 node 20 is shown to be a master node. Furthermore, one of the nodes may be a security controller to provide the control for the AKM functions needed for security. The other nodes provide the points at which Client/Equipment can "plug into" or connect to the network, either by wired (cable/twisted pair or another type of wiring) or wireless access. This may be referred in the following also as "engaging with the network". Engaging of a client/equipment with a node can be therefore be wired or wireless and can be considered as the result of an authentication or registration process of the client/equipment with the node which allows the client/equipment to provide communication by utilizing this node as access to the network. Engaging therefore includes for example an association of the client with an access point as is known in the various WLAN standards, a wired communication in which the registered client/equipment is communicating over cable with the node etc.

In conventional approaches to the security of home networks, the actual encryption algorithm is applied by the nodes. The Client/Equipment uses the system for transport of messages to other Client/Equipment and accepts, as a service, the guarantee of confidentiality. In such conventional network systems such as for example IEEE 802.11-2007, the security is provided by the so-called Medium-Access Control (MAC) layer in the Data Plane of the communication protocol.

It is to be understood that a Client/Equipment can generate an enhanced degree of security by individually encrypting its communications before passing this data payload to the MAC layer for transport. However, such an approach would burden the communication with additional overhead. An encryption engine would have to be provided within the Client/Equipment, and in the far-end partner of the communication link at node 14 and the parameters of encryption would have to be negotiated with the far end. In other words, two completely different systems of security would be utilized at the same time.

Another approach to providing an enhanced degree of security, while using only the facilities provided by the home network's MAC-level security system, could be to allow the Client/Equipment to initiate a change of the encryption key used by the two nodes involved in the more-secure communication. All other Clients/Equipment using this same link will also be given enhanced protection, since their messages will be encrypted by the same fresh key. Every AKM system can use this approach, since every AKM system must provide a mechanism for changing keys. It is a matter of security maintenance that encryption keys must not be used for too many messages, since each encrypted message provides material for an attacker to attempt to break the key. A new key is, therefore, much harder to break, because there is no pre-existing material upon which the attacker can draw to feed the attack. However, a serious drawback of this approach is that it introduces an additional delay in setting up the more secure communication channel. The authentication & key-exchange (AKE) protocol has to be enacted before each and every more-secure transmission. Additionally, if during this communication there is a change of the node or access point, the AKE operation has to be done again, introducing more delay, and even the possibility of failure if, for example, the Security Controller is not available for some reason.

According to embodiments, an approach that overcomes these limitations will be described in the following.

The AKM procedures already in use are modified in one way. If the length of the key under the original unenhanced procedure was L, the length under the enhanced procedure will be longer, for example 2 L. This applies to every encryption key used for every pair of nodes. This entails no extra complexity or step of additional procedure, simply an increase in key length. In particular, the new key used by the pair of nodes can be provided without any further exchange of a key between the first and second node such as in the key exchange according to the AKE protocol. Therefore the new key can be provided immediately at each node.

When performing the "enhanced" level of encryption under the enhanced procedure, the full-length negotiated encryption key is used. Thus, the more sensitive communication will be protected by a key of length 2 L.

When performing the unenhanced level of encryption under the enhanced procedure, use only the first half of the negotiated encryption key. This leaves "normal" communications protected by a key of length L—which was the original degree of protection offered by the unenhanced procedure.

A need for enhanced security can be signaled within the normal protocol for initiating a communication between nodes, by a new indicator that states the desired security mode. In some embodiments, there may be only two modes: Normal and Enhanced. However, in other embodiments more modes can be defined and can be implemented by employing different fractions of the originally negotiated key. For example, to define 4 modes with increasing degrees of security, the Normal mode could use one-fourth of the full key, the First-Enhanced mode could use one-half of the full key, the Second-Enhanced mode could use three-fourths of the full key, and the Third-Enhanced mode could use the full key. In any case, the full key will have been negotiated between the nodes, with the services of the Security Controller, long prior to the need for this enhanced communication and its length must be such that even the lowest level of encryption, Normal, is considered acceptable for use in the home network.

Figures 4A, 4B:
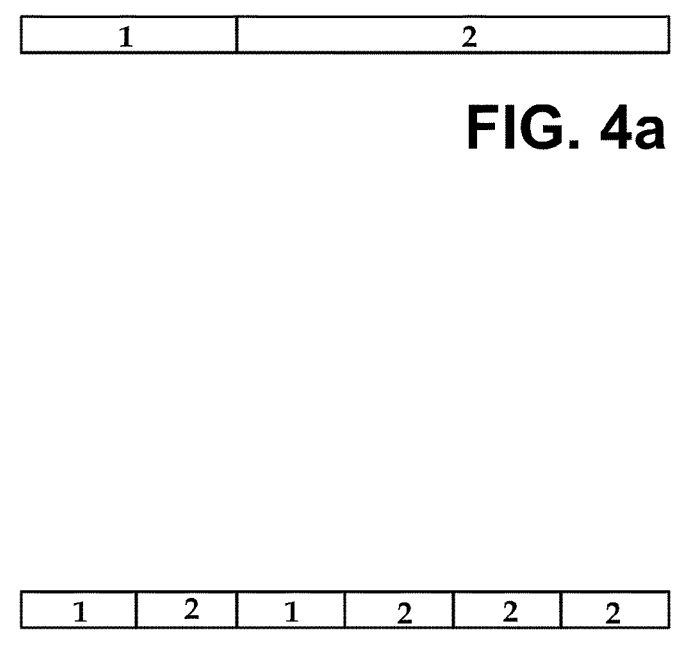

In some embodiments, the full key may never be used for any of the security levels but only a fraction of the key. When using a fraction of the key, the keys used may include parts of the full key such that a part used in one key may not be used in any other key. Or in other words, the keys having only a fraction of the length of the full key contain non-overlapping parts of the full key. The key having a fraction of the full key may in some embodiments be a contiguous section of the full key. For example by referring to FIG. 4a, in an embodiment of using two levels of securities, the first third of the full key may be used for the lower security level and the last two-thirds may be used for the higher level security. In FIG. 4a, the part referenced with "1" indicates the section of the key used for the lower level security and the part indicated with "2" indicates the section used for the higher level security. In other embodiments, the key having a fraction of the full key may consist of various parts of the full key. Referring to FIG. 4b, an embodiment is shown in which the first ⅙ and the third ⅙ is used for the security with lower level and the second ⅙ and the fourth ⅙ to sixth ⅙ of the full key are used for the higher level security. Thus, although still a fraction of ⅓ of the overall key is used for the key at lower security level and a fraction of ⅔ of the key is used for the key at the higher security level, the parts which are used for the key are no longer contiguous. In some embodiments, the parts which are used to construct the key may change after a certain time or when a certain security level is repeatedly used.

The above-described approach provides different degrees of encryption protection to different applications and clients. However, according to embodiments, if a Client/Equipment changes nodes or access points during the course of the communication, the enhanced degree of protection will be provided by the new node. This will affect other communications that are being provided by the nodes.

Figure 2:
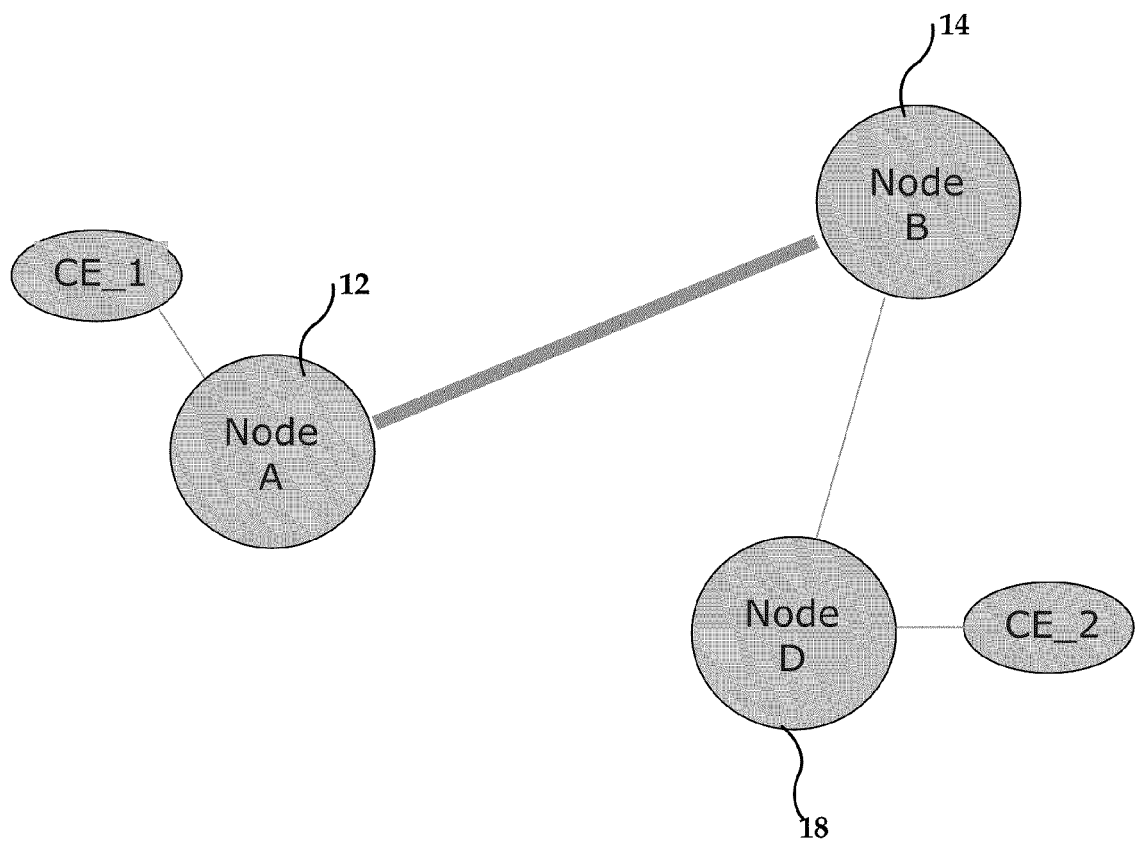
FIG. 2 shows a diagram of a network according to an embodiment.

For example, suppose the Client/Equipment CE_1 is using node 12 for a confidential communication to another equipment using node 14. Under the approach defined above, CE_1 will have already requested "enhanced" security in setting up this communication, so node 12 will be using the full-length key for its communications with node 14. This is shown in FIG. 2. Please note that nodes 16 and 20 are not shown in FIG. 2 although they may in embodiments well be part of the network.

Figure 3:
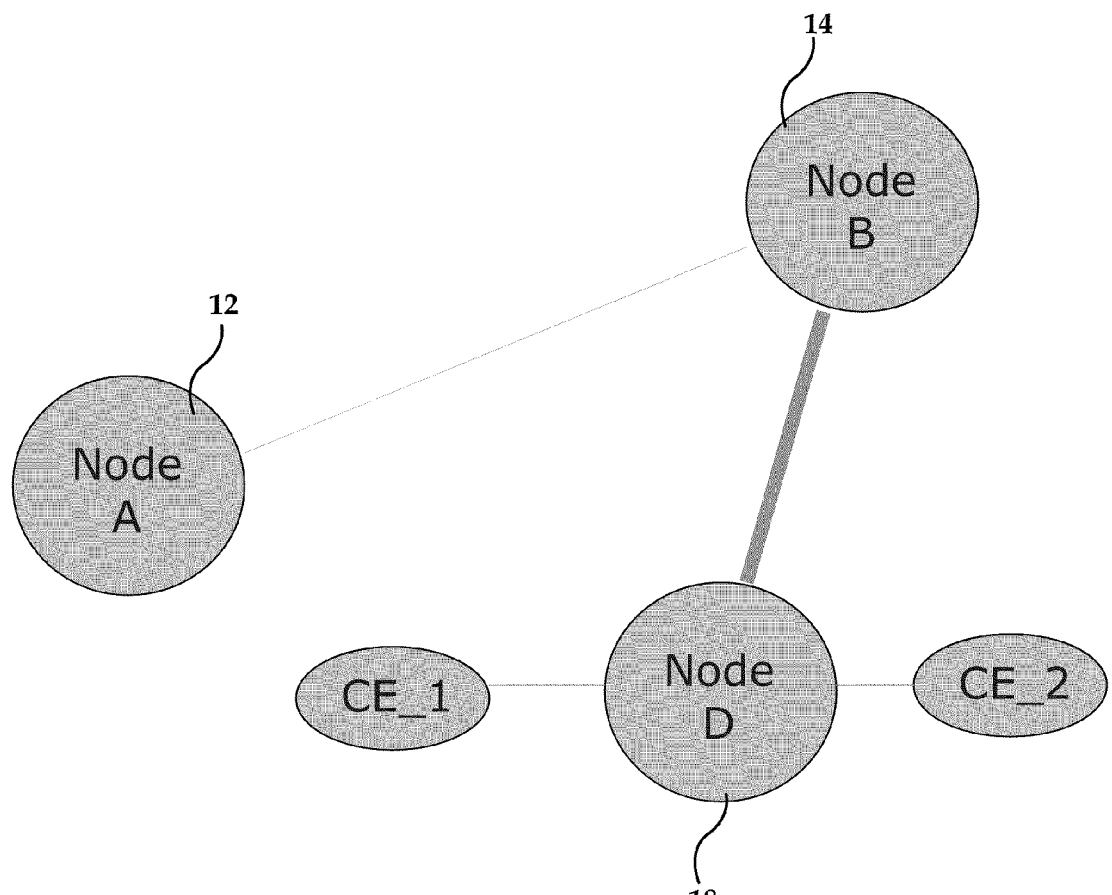
FIG. 3 shows a diagram of a network according to an embodiment.

Now suppose that CE_1 is disengaged (for example unplugged) from node 12 and engaged with node 18. There will be an Authentication procedure by which CE_1 and node 18 are each assured that an association of CE_1 with node 18 is allowed. This will be discussed further below. But in addition, CE_1 will indicate to node 18 that it is engaged in communication with node 14 at, for example, First-Enhanced level of protection. Thus, node 18 will be required to provide at least First-Enhanced level, by using a greater-than-normal fraction of the full encryption key. This situation is shown in FIG. 3.

However, it may be the case that Client/Equipment CE_2 was already using node 18 to communicate with node 14. If CE_2 was only using normal level of protection, it will have to be provided with First-Enhanced level after CE_1 has connected to node 18, because node 18 can only communicate with node 14 with one level of security at a time: the link between node 18 and node 14 can only use one key at a time. On the other hand, it might also be the case that CE_2 was already using Second-Enhanced level protection for communication with node 14. In this case, CE_1 will be provided Second-Enhanced level protection without a change in the encryption behavior of node 18.

Whether or not node 18 must change the key length it is using, this decision may in embodiments be invisible to CE_1 and to CE_2, as the encryption is provided as a service to them. Both will be provided with a satisfactory level of security provided that node 18 operates at the higher of the security levels requested. Providing the security as a service to the Client/Equipment allows that the Client/Equipment does not have to take care of any security aspects related to the links of the network. In fact, the Client/Equipment gets the requested security guaranteed when using a particular link of the network and therefore the security issues of the network links such as for example a switching of the security level necessary in order to provide the requested security of the Client/Equipment can be hidden for the Client/Equipment.

It should also be pointed out that, even while the key-length for the communication between node 18 and node 14 is being re-negotiated, the key-length for any communication between node 18 and a different node, such as node 20, can be provided unchanged. The security level is defined per communication link (node-to-node), not per node.

Likewise, when CE_1 left node 12, it would not be strictly necessary for the link between node 12 and node 14 to be "down-graded", although if no other communicating equipment using that link needed an enhanced level of security, this could be done.

Referring to the above mentioned Authentication between CE_1 and node 18, conventional methods of home network security do not recognize such associations between the MAC-level nodes and the Client/Equipment, which are generally considered Application-layer entities. For example, in networks according to IEEE 802.11-2007 both Access Points and Wireless Stations are recognized as being node-level entities, but not the Client Applications that run on the Wireless Stations. Client Applications may for example include an application sending and receiving emails, a video application receiving video data in order to show a video on a monitor of the user etc. However, Client Applications can be identified by identifiers at a different protocol layer, such as by an IP address or an Ethernet MAC address. In data transmission, these identifiers are placed in parts of the packet that are not normally read by the home network's MAC Data Plane. However, during a Control-Plane transaction, such as would be invoked for a change of node, embodiments provide a MAC-layer Control Plane system with the capability of reading the actual identifier of the Client Application which will be denoted also as the "Application ID". The combination of the node ID for the newly attached node 18 and the Application ID for CE_1 is then to be validated by the Security Controller against a previously established list of allowed combinations. The Application ID may be provided in embodiments in a header of each data packet send. The header is analyzed by the MAC-layer of the respective node providing the access to the network and the security used for this data packet is then determined based on the Application ID detected in the header.

The validation of Client/Equipment ID and node ID combinations additionally allows the Security Controller to provide control over which services can be provided from which nodes. A combination that is not allowed by the Security Controller will not be able to exchange meaningful information.

Furthermore, the above described security may in some embodiments achieve communications over the same link with different security levels. In other words, there is not only provided a single security level for communication between two nodes but instead there is provided different security levels for different client/equipment currently using a specific link. For example, assume that client/equipment CE_1 and CE_2 are both engaged with node 18 as shown in FIG. 3. When the MAC-layer Control Plane at nodes 18 and 14 have the capability of checking or analyzing the Application IDs of different applications, communication over the link between nodes 18 and 14 can be provided such that for the Client/Equipment CE_1 a first security level is used by utilizing for example a key with a first length, and for Client/equipment CE_2 which is engaged at the same time with node 18 a second security level is used by utilizing a key having a second length.

The described embodiments of providing security protection can be implemented in network nodes such as wired modems, user equipment, wireless access points etc.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. The term "information" may in addition to any form of digital information also include other forms of representing information. The term "entity" or "unit" may in embodiments include any device, apparatus circuits, hardware, software, firmware, chips or other semiconductors as well as logical units or physical implementations of protocol layers etc. Furthermore the terms "coupled" or "connected" may be interpreted in a broad sense not only covering direct but also indirect coupling.

It is further to be noted that embodiments described in combination with specific entities may in addition to an implementation in these entity also include one or more implementations in one or more sub-entities or sub-divisions of said described entity. For example, specific embodiments described herein described herein to be implemented in a transmitter, receiver or transceiver may be implemented in sub-entities such as a chip or a circuit provided in such an entity.

The accompanying drawings that form a part hereof show by way of illustration, and not of limitation, specific embodiments in which the subject matter may be practiced.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended.

It is further to be noted that methods disclosed in the specification or in the claims may be implemented by a device having means for performing each of the respective steps of these methods.

What is claimed is:

1. A method comprising:
controlling by a security controller the use of a node in a network for a service or application to transmit data via the node, wherein the security controller controls the use of the node based on a predetermined list indicating whether the service or application is allowed for the node, the predetermined list including combined identifiers for client applications and identifiers for network nodes; and
analyzing a packet that includes a combined client application identification and a network node identification, at least the client application identification included in a header of the packet, the analyzing of the packet being performed by a Medium-Access Control (MAC) Control Plane of the security controller.

2. The method according to claim 1, wherein the predetermined list includes at least two services or two applications from a same entity.

3. The method according to claim 1, wherein the service or application is implemented at a first communication protocol layer and the node is implemented at a second communication protocol layer, the first communication protocol layer being higher than the second communication protocol layer.

4. A method comprising:
providing information indicating allowable combinations of nodes and client applications, the information indicating the allowable combinations based on combined identifiers for client applications and identifiers for network nodes;
analyzing a packet that includes a combined client application identification and a network node identification, at least the client application identification included in a header of the packet, the analyzing of the packet being performed by a Medium-Access Control (MAC) Control Plane of a security controller; and
using the information in the security controller of a network to control the provision of services by the nodes of the network.

5. The method according to claim 4 further comprising: combining the identifiers for client applications and the identifiers for network nodes.

6. A device configured to control the use of a node in network for a service or application of an entity of the network by a hardware security controller, wherein the security controller analyzes a packet that includes a combined client application identification and a network node identification, at least the client application identification included in a header of the packet, the analyzing of the packet being performed by a Medium-Access Control (MAC) Control Plane of the security controller and wherein the security controller controls the use of the node based on predetermined list indicating whether the service or application is allowed for the node, the predetermined list including combined identifiers for client applications and identifiers for network nodes.

7. The device according to claim 6, wherein the predetermined list includes at least two services or two applications from a same entity.

8. The device according to claim 6, wherein the service or application is implemented at a first communication protocol layer and the node is implemented at a second communication protocol layer, the first communication protocol layer being higher than the second communication protocol layer.

9. A hardware network security controller, the controller configured to provide information indicating allowable combinations of client applications and nodes and to use the information to control provision of services by the nodes in the network, the information indicating the allowable combinations based on combined identifiers for client applications and identifiers for network nodes, the controller further configured to analyze a packet that includes a combined client application identification and a network node identification, at least the client application identification included in a header of the packet, the analyzing of the packet being performed by a Medium-Access Control (MAC) Control Plane of the controller.

10. The controller according to claim 9, further configured to combine identifiers for client applications and identifiers for network nodes.

11. A network system comprising:
a hardware network security controller, the controller configured to provide information indicating allowable combinations of client applications and nodes and to use the information to control provision of services by nodes in the network, the information indicating the allowable combinations based on combined identifiers for client applications and identifiers for network nodes, the controller further configured to analyze a packet that includes a combined client application identification and a network node identification, at least the client application identification included in a header of the packet, the analyzing of the packet being performed by a Medium-Access Control (MAC) Control Plane of the controller.

12. A network system comprising:
a device configured to control the use of a network node for a service or application of an entity of the network by a security controller, wherein the security controller controls the use of the node based on a predetermined list indicating whether the service or application is allowed for the node, the predetermined list including combined identifiers for client applications and identifiers for network nodes, and wherein the controller analyzes a packet that includes a combined client application identification and a network node identification, at least the client application identification included in a header of the packet, the analyzing of the packet being performed by a Medium-Access Control (MAC) Control Plane of the controller.

* * * * *